April 22, 1952  E. L. THOMAS  2,593,501
STROBOSCOPE

Filed June 4, 1947  4 Sheets-Sheet 1

Inventor
ERIC LLOYD THOMAS
By
Herbert H. Thompson
his Attorney

April 22, 1952     E. L. THOMAS     2,593,501
STROBOSCOPE
Filed June 4, 1947     4 Sheets-Sheet 2
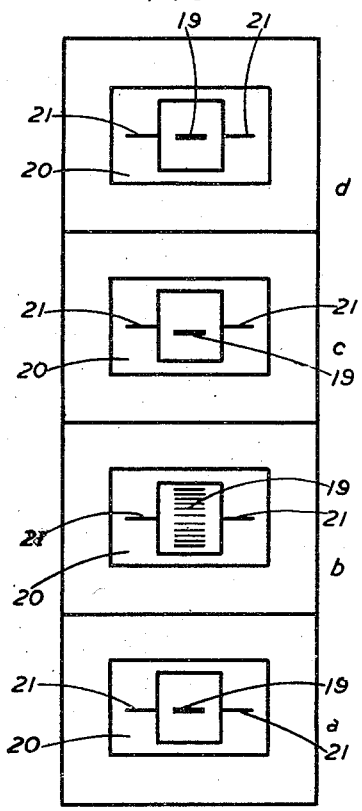
*Inventor*
ERIC LLOYD THOMAS
By Herbert H. Thompson
*his Attorney*

April 22, 1952     E. L. THOMAS     2,593,501
STROBOSCOPE

Filed June 4, 1947                                                4 Sheets-Sheet 3

Inventor
ERIC LLOYD THOMAS
By
Herbert H. Thompson
his Attorney

April 22, 1952  E. L. THOMAS  2,593,501
STROBOSCOPE
Filed June 4, 1947  4 Sheets-Sheet 4
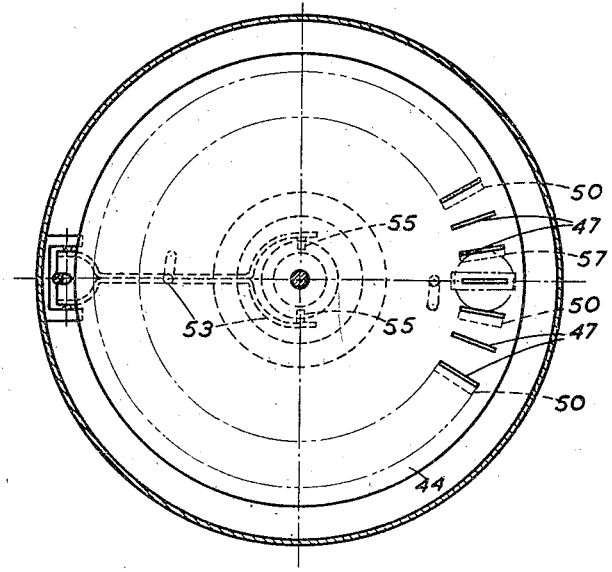
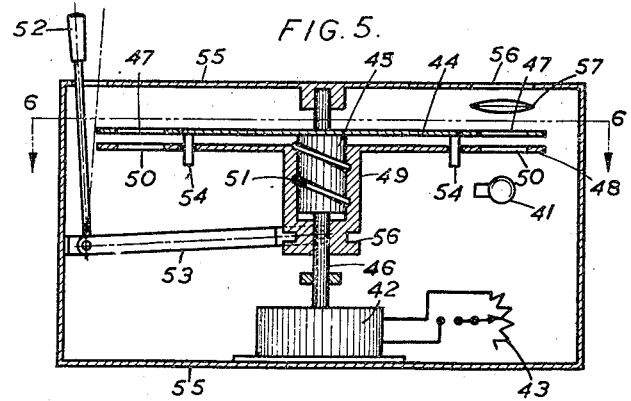
Inventor
ERIC LLOYD THOMAS
By
Herbert H. Thompson
his Attorney Patented Apr. 22, 1952

2,593,501

UNITED STATES PATENT OFFICE 2,593,501

STROBOSCOPE

Eric Lloyd Thomas, Wembley, England, assignor to The Sperry Corporation, a corporation of Delaware Application June 4, 1947, Serial No. 752,483
In Great Britain March 15, 1946

2 Claims. (Cl. 315—227)

This invention relates to stroboscopes.

For purpose of this specification and the claims appended thereto a stroboscope is defined as an instrument or apparatus that so controls the effectiveness of light emanating from a field under examination upon some light sensitive apparatus or upon the eye of an observer that such light is effective in recurrent flashes, usually of relatively short and substantially equal durations separated by ineffective intervals, usually of relatively long and substantially equal durations. Stroboscopes fall broadly into two classes, namely those in which the field is intermittently illuminated in flashes, and those in which the field is more or less steadily illuminated and the more or less steady light emanating from the field is in some manner rendered ineffective upon the light-sensitive apparatus or upon the observer during the ineffective intervals. In the first-mentioned class, the field may be illuminated in flashes produced by a light source that is intermittently and recurrently energized, or produced by means of some form of occulting device, shutter or modulator that interrupts or modulates the light flux from a substantially steady light source. In the second-mentioned class, some form of occulting device, shutter or modulator may be interposed between the field and the light sensitive apparatus or the eye of the observer; or, in the case of a light-sensitive apparatus, means may be provided that permits the light sensitive apparatus to be fully sensitive or to be fully effective only during the flashes and reduces its sensitivity or effectiveness during the intervening intervals. The invention in its broader aspects is applicable to stroboscopes of both these classes and in all forms.

The principle involved in the operation of the stroboscope is well known, but, in order to make the invention clear, it may be briefly outlined as follows. If an object has a cyclical or repetitive movement such that it occupies the same position or attitude after successive equal intervals of time and if means are provided whereby light emanating from a position in the path of the object is permitted to be effective, either upon an observer or in a light sensitive apparatus, in flash recurring at equal intervals; then, if the frequency of recurrence of the flashes is equal to or is a submultiple of the frequency of the cyclic movement of the object, the latter will be in the same position at the occurrence of every flash and will appear to an observer to be stationary in that position. Conversely, if the object is in fact in the same position at the occurrence of every flash, and thus appears to be stationary to an observer, the frequency of the flashes is equal to, or is an integral submultiple of, the frequency of the cyclical movement of the object. It is, however, impossible to determine from one such observation alone whether the frequency of the flashes is in fact equal to, or is an integral submultiple, and, if so, what submultiple, of the frequency of the cyclical movement of the object. One of the main purposes of the present invention is to provide in a stroboscope means for readily making such determination without difficulty or ambiguity and with small liability to error.

It will be understood that the word "object" is herein used in a broad sense to include not only a member or body but also a mark upon a member or body, such as a reference mark upon a rotating wheel or shaft. Moreover it will be assumed hereinafter that in the case of any body or member rotating about an axis passing through it, it is asymmetrical or is asymmetrically marked with respect to its axis of rotation so that any one of its possible positions may be visually distinguished from any other of its possible positions.

In order to make this determination it has been customary, after first setting of whatever control member was employed to adjust the flash-frequency until the object appeared stationary, to readjust that control member to such position that the flash-frequency was known to be double that accruing from the first setting, and to observe whether the object now appeared in two or any other numbers of positions. If the object appeared to be stationary in two, and two only, positions the frequency accruing from the first setting was equal to the frequency of the cyclical movement of the object or to an odd integral submultiple of that frequency. For example, when utilising a stroboscope, of which the flash-frequency is determined by a calibrated frequency-setting member, for ascertaining the frequency of some cyclically recurrent motion of an object, it has been usual to adjust the frequency setting member until the object appears stationary in one position, to note the frequency so determined by the calibrated frequency-setting member, then to readjust the frequency-setting member so that the flash-frequency determined by it is double that noted, and then to ascertain whether the object appears stationary in two and two only positions; if so, the frequency noted was known to be equal to the frequency of the cyclically recurrent motion of the object or to an odd integral submultiple of it, if not so, it was necessary to repeat the operation and observations, finding a different first setting of the calibrated frequency setting member that would again cause the object to appear stationary in one position only.

One object of the invention is to provide a stroboscope the flash-frequency of which may be varied continuously through a range of frequencies and, in addition may be increased in a step by a predetermined factor.

Another object is to provide a stroboscope of which the flash-frequency may be varied continuously through a range of frequencies and may be doubled by independent manual operations.

Another object is to provide a stroboscope with facile means for determining whether the flash-frequency is equal to or is a sub-multiple of the recurrence frequency of a cyclical movement.

Another object is to provide a stroboscope with facile means of determining whether the flash-frequency is equal to, or what submultiple it is, of the recurrence frequency of a cyclical movement.

Another object is to provide calibrating means for calibrating or standardizing the flash-frequency of and scaling of a stroboscope.

The present invention, in one of its aspects, may be regarded as lying in a stroboscope comprising manually operable continuously adjustable flash-frequency setting means arranged to change the flash-frequency continuously through a range of frequencies, and comprising calibrated indicating means arranged in association with the flash-frequency setting means to be capable of indicating any particular flash-frequency set by the setting means, wherein the flash-frequency produced by the stroboscope is manually changeable at will to a predetermined multiple of, and is restorable at will to, the frequency indicated by the indicating means without disturbance of the latter. The flash-frequency produced by the stroboscope is preferably manually changeable at will to substantially twice the frequency indicated by the indicating means. In the utilization of such a stroboscope, the operator may adjust the setting means from a position determining a frequency believed to be substantially lower than that of the cyclical movement of the object under examination in such a manner as to increase the flash-frequency until he finds what he believes to be the position of the setting means giving the highest flash-frequency at which the object appears stationary in one position only. He may then check that he has obtained the correct setting of the indicating means by manually changing the flash-frequency produced by the stroboscope to double that indicated by the indicating means without disturbance of the latter. If, now, the object appears to be stationary in two positions, and in two positions only, the operator is satisfied that the frequency indicated by the undisturbed indicating means of the stroboscope is the same as the frequency of the cyclical motion of the body or is an odd submultiple of that frequency.

In some stroboscopes particularly those of the class first mentioned, the flash-frequency is governed by the product of the magnitudes of two quantities, such as resistance and reactance included in an electric circuit. In the application of the invention in such stroboscopes, the magnitude of one of the two quantities may be continuously adjustable and may be controlled by the setting means. The other of the two quantities may then be adjusted in a step, preferably from one magnitude to double that magnitude, under the control of an independent manually operable control member, by means of which that quantity may be caused to have either its greater or its lesser magnitude. In this case the indicating means may be in permanent driving connection with the setting means. The invention in this form is particularly applicable to that kind of stroboscope, generally of the class first referred to, that includes a relaxation oscillator, incorporating a regeneratively arranged electronic amplifier that produces pulses of electrical energy at a frequency determined mainly by the time constant of an electrical circuit including resistance and capacity. In such application either one of the resistance or the capacity may be continuously adjustable over a range of magnitude and the adjusting means of this one may then be actuated by the setting means, with which latter the indicating means is in permanent driving connection; and the other may then comprise two units of which one is permanently connected in the electrical circuit and the other unit may be so controlled by an independently operable switch, constituting the independently operable control member, that it may be optionally rendered effective in the electric circuit, so that its magnitude is effectively added to that of the one unit. This form of the invention is particularly useful for stroboscopes of the first mentioned class in which the pulses of electrical energy produced by a relaxation oscillator are utilized to energize a lamp, usually and suitably a gas-filled cold cathode discharge lamp, or to control the discharge of a grid-controlled discharge lamp, so that the lamp produces a luminous flash in response to each such pulse.

The invention may be carried out in another manner as applied to any stroboscope having a continuously adjustable flash-frequency determining system adjustable by manually operable setting means operatively connected to it. To this end the stroboscope may be equipped with a scale and index combination, suitably marked with indications of flash-frequency, and manually operable clutching means may be arranged alternatively to connect operatively with and to disconnect from the manually operable setting means one of the components of the scale and index combination. In the operation of such an arrangement, the operator should adjust the manually operable setting member, with the clutching means operated to engage the one of the scale and index combination that is operative with the setting means, until he observes that the object under examination appears to be stationary in one position only. He should then operate the clutching means to disconnect the one of the scale and index combination from the setting means and move the latter to the position at which the flash-frequency is doubled, and this may be done without causing relative movement between the scale and index. If, now, the object appears stationary in two, and only two positions, the frequency indicated by the scale and index combination is the frequency of the cyclical motion of the object or an odd submultiple thereof. In order to facilitate this operation and to obviate risk of relative movement of the scale and index combination, the clutching means is preferably so arranged as to lock the scale and index relatively to one another when the one of them is disconnected from the setting means.

Thus the manually operable clutching means is provided for at will connecting alternatively one of the components of the scale and index combination to the manually operable setting means and locking it relatively to the other component. Furthermore, resilient or elastic means may interconnect the one of the scale and index combination and the setting means, so as to tend, when the former is locked relatively to the other component of the scale and index combination, to align the setting means with it.

In order that the arrangement just referred to shall be easy to operate, it is convenient that the setting means controls the flash-frequency in a logarithmic fashion, that is so that equal displacements of the setting means cause changes in constant ratio of the flash-frequency. Thus the flash-frequency may be doubled, as is desired, by some particular displacement of the setting means, irrespective of the initial frequency and the point from which such displacement is made. When the arrangement is of this nature, a lost motion connection is preferably incorporated between the one component of scale and index combination and the setting means so as to limit the displacement of the setting means that may take place when that one component of the scale and index combination is locked and preferably to limit this displacement to what will produce a doubling of the flash-frequency. Furthermore, when the setting means controls the flash-frequency in such logarithmic fashion, an auxiliary scale element is preferably rigidly connected with the setting means and is arranged to cooperate with that one of the scale and index combination that is associated with the clutching means. Such a scale may be of length or extent corresponding to or slightly exceeding the relative displacement permitted by the lost motion connection between the setting means and that one component of the scale and index combination that is associated with the clutching device, that is it may be of sufficient extent to accommodate a scale calibrated in frequency change factors from unity to two.

In the use of the stroboscope, if the frequency to which the instrument is initially set to cause the object to appear stationary in one position only, if its flash-frequency then be increased continuously until it is double, and if at no flash-frequency between these two does the object appear to be stationary in one position; then the lower or initial flash-frequency of the stroboscope is the frequency of the cyclical motion of the object or an odd submultiple thereof. If, however, while the flash-frequency of the stroboscope is being increased towards double its initial frequency, the object appears stationary at one position at some frequency intermediate the initial flash-frequency and double that initial frequency, the initial flash-frequency was a submultiple of the frequency of the cyclical movement of the object, and what particular submultiple it was may be derived from the next higher flash-frequency at which the object appeared stationary in one position. Thus an indication of the correct frequency of the cyclical motion of the body may be provided on the auxiliary scale element by means of multiplying factors marked thereon, to be read in conjunction with that one of the scale and index combination that is associated with the clutching means and is locked thereby.

In another embodiment of the invention that is applicable to stroboscopes of either of the two classes previously mentioned, the stroboscope comprises: a rotary occulting shutter adapted alternately to transmit and occult light; motive means operatively connected with the shutter for rotating it; means for changing continuously through a range of speeds the speed of the motive means, whereby the frequency of transmission and occultation, that is the flash-frequency, may be varied continuously over a range of frequencies; and manually operable means for changing by a predetermined factor the number of transmissions and occultations produced by the shutter in each revolution. Thus the rotary occulting shutter may comprise an opaque member having an even number of equally spaced apertures remote from its axis of rotation and secured to a rotary shaft, and a second member, coaxial with and adjacent the opaque member and angularly displaceable with respect thereto but in driving engagement with the shaft. The second member may have equally spaced opaque portions, in number equal to one half of the number of equally spaced apertures of the opaque member, so disposed as to be capable of obstructing alternate ones of those apertures. The manually operable means may then be arranged to displace the second member relatively to the opaque member angularly to and from a relative position in which its opaque portions obstruct alternate equally spaced apertures of the opaque member, so that the frequency of transmission and occultation, that is the flash-frequency, may be changed by a factor of two. To this end the opaque member and the second member may be interconnected by a coaxial screw and nut connection, and one of these may be in direct driving connection with the motive means, the manually operable means may then be arranged to impart relative displacement in an axial direction to the opaque and second members so that they are relatively displaced angularly by the screw-and-nut connection.

The invention also includes the combination with a stroboscope adapted to produce flashes of light repetitively at a frequency that is adjustable over a range of a resonant system having a known natural frequency of oscillation harmonically related to some frequency within the said range, this resonant system being coupled to the stroboscope in such manner that it is impulsed in synchronism with the flashes produced by the stroboscopes. Thus if the flash-frequency of the stroboscope be varied until the resonant system is observed to have a large or maximum amplitude of oscillation, the frequency of the stroboscope that produces such large or maximum amplitude is known to be close to a frequency that is harmonically related to natural frequency of the resonant system. In this manner the calibration of one point in the range of the adjustment of the flash-frequency of the stroboscope is effected. If the natural frequency of the resonant system be a fairly large multiple of the highest flash-frequency in the range of the stroboscope, a fairly large number of such calibration points is available.

In order to obtain a higher degree of accuracy in utilizing the calibrating resonant system referred to, it is preferably so arranged with respect to the stroboscope as to be illuminated only or mainly coinstantaneously with the flashes of the stroboscope.

The resonant system may conveniently comprise a vibratile electromagnetic reed disposed in the field of an electromagnet. When the stroboscope is, for example of the class first herein referred to and includes an electric lamp energized by pulses of electric current, the electromagnet may be energized by coupling it electrically to the circuit controlling the lamp. In other cases, when for example the stroboscope includes a rotary shutter, the electromagnet may be connected in series with a source of electrical supply and a pair of contacts that are made and broken by means such as a cam rotating with or geared to the shutter. However, in the cases of a stroboscope incorporating a rotary part revolving at a speed related to the flash-frequency, the rotary part may have a very slight dynamic unbalance and a resonant vibratile member may be mounted upon the frame or base of the stroboscope so that it is excited by a loose mechanical coupling to the rotary part.

For the better understanding of the invention it will now be described by way of example only with reference to the accompanying drawings in which:

Fig. 2 is a diagram demonstrating the appearance in various circumstances of a vibratile reed shown in Fig. 1.

Fig. 5 is a diagramamtic transverse section of a form of stroboscope in accordance with the invention incorporating a rotary shutter.

Fig. 6 is a section on the line 6, 6 of Fig. 5.

Figure 1:
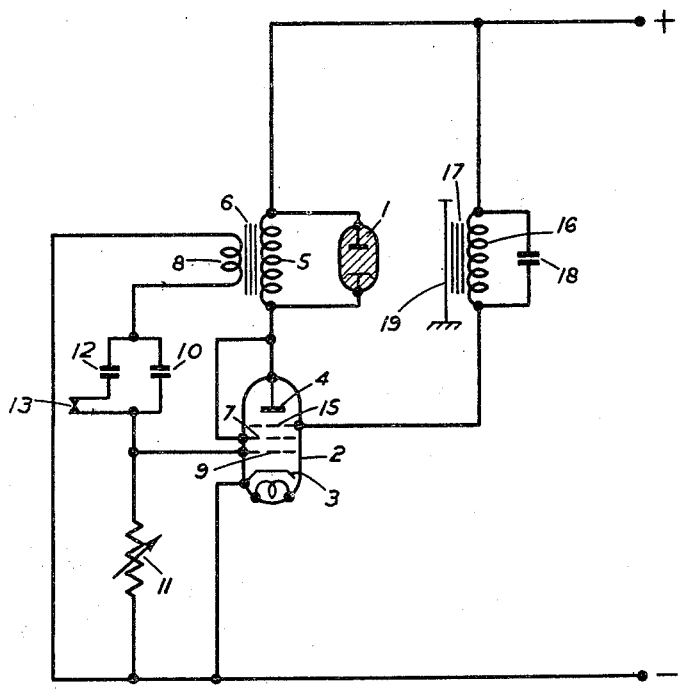
Fig. 1 is an electrical circuit diagram of a stroboscope of the first mentioned class incorporating one form of the invention.

Referring now to Fig. 1, the particular form of stroboscope, of which the electrical circuit diagram is shown, is of the first mentioned class and employs an electric lamp that is energized for short flashes and illuminates the field and object to be observed. The stroboscope comprises a relaxation oscillator that energizes a cold cathode glow discharge lamp 1 with a short pulse in every cycle.

The relaxation oscillator comprises a pentode valve 2 of which the cathode 3 is connected to the negative terminal of a source of high voltage continuous electrical supply. The anode 4 and screen grid 7 of the valve 2 are connected through the primary winding 5 of a transformer 6 to the positive terminal of the continuous electrical supply. One end of the secondary winding 8 of the transformer 6 is connected through a condenser 10 to the control grid 9 of the valve 2. The other end of the secondary winding 8 is connected to the cathode 3 and negative terminal of the continuous electrical supply, to which point the control grid 9 is also connected through a continuously adjustable resistor 11. A condenser 12 and switch 13 in series with one another are connected in parallel with the condenser 10. The condenser 12 has a capacity equal to that of the condenser 10. The suppressor grid 15 of the valve 2 is connected through the winding 16 of an electromagnet 17 to the positive terminal of the continuous electrical supply. The winding 16 is shunted by a condenser 18. A resonant vibratile reed 19, fixed to a rigid base, is arranged in the field of the electromagnet 17 and is of ferro-magnetic material or carries a ferro-magnetic armature so that it may be attracted by the electromagnet when the latter is energized. A cold cathode glow discharge lamp 1 is connected across the primary winding 5 of the transformer 6, so that the electromotive force set up in that winding is applied to it.

In the operation of the stroboscope shown in Fig. 1, it may be assumed as a starting point that the grid 9 of the valve 2 has been driven so negative with respect to the cathode 3 that no current flows from the anode 4 and suppressor grid 15 to the cathode 3 of the valve 2. In these circumstances the lower plate of the condenser 10 (and of condenser 12 if the switch 13 is closed) have a considerable negative charge. This negative charge leaks away through the resistor 11 until the potential of the grid 9 reaches such a value that the valve 2 commences to conduct. Forthwith current flows through the valve 2 and primary winding 5 of the transformer 6, and an electromotive force is induced in the secondary winding 8. The secondary winding 8 is connected in such a sense that this electromotive force, applied to the grid through the condenser 10 (and through the condenser 12 if the switch 13 is closed), drives the potential of the grid 9 more positive, so to cause the space current through the valve 2 and primary winding 5 still further to increase. Thus the valve is rendered rapidly and cumulatively more conducting until, in a very short interval of time, it becomes fully conductive and the potential of the grid 9 is driven positive with respect to that of the cathode 3. Grid current therefore flows. As soon as the valve 2 has been thus rendered fully conducting, the electromotive force induced in the secondary winding 8 ceases, since the current through the primary winding 5 changes no longer. The potential of the grid 9, therefore, relapses to a considerably negative value with respect to that of the cathode owing to the negative charge acquired by the condensers owing to grid current when the grid 9 was driven positive. The relapse of grid potential causes the valve anode current to be reduced, and consequently an electromotive force in the reverse sense is induced in the secondary winding 8 of the transformer 5, which drives the grid potential still more negative with respect to that of the cathode 3. Consequently the space current of the valve is rapidly and cumulatively reduced toward zero. The valve is cut off and the condenser or condensers are left with a considerable negative charge that again leaks gradually away through the resistor 11, after which the cycle is repeated.

The space current that flows to the suppressor grid 15 and through the winding 16 of the electromagnet 17 behaves in a manner similar to the current flowing to the anode 4 and through the primary winding 5 of the transformer 6, since it is controlled by the same grid 9. Consequently, in each repetitive cycle, single pulses of current flow simultaneously through the primary winding 5 and the winding 16 of the electromagnet. The time intervals that elapse between these pulses of current are determined by the product of the magnitudes of the capacity connected between the winding 8 and the grid 9 and the resistor 11. These time intervals are usually long as compared with the intervals occupied by the pulses, and may therefore be regarded as the period of the cycle.

The lamp, is of such a nature that no current flows through it until the voltage applied to it exceeds a threshold value and the current ceases as soon as this voltage falls to a somewhat lower value. The lamp emits light only during the time that current flows through it. Thus, corresponding to each pulse of current through the valve 5, an even shorter pulse of light is emitted by the lamp 1.

According to the invention as exemplified in Fig. 1, the resistor 11 is adjustable by means of a handle, constituting flash-frequency setting means, with which a scale or other calibrated indicating means, not shown, is associated. Furthermore the condensers 10 and 12 are given such predetermined capacities that by operation of the switch 13 the flash-frequency is changed by a predetermined multiple or factor. Usually the desired multiple or factor is two, in which case the condensers 10 and 12 have equal capacities.

In using the stroboscope exemplified in Fig. 1 the operator should move the switch 13 to its closed position. He should then adjust by means of the setting means referred to the magnitude of the resistor 11 until a cyclically moving object illuminated by the lamp 1 appears to be stationary in one position. He should then move the switch 13 to its open position, thus doubling the flash-frequency. If, now, the object appears to be stationary in two positions, the frequency to which the setting means was adjusted and indicated by the calibrated indicating means is the frequency of the cyclical movement of the object or an odd submultiple thereof.

For the purpose of calibrating the stroboscope, the operator may observe the vibratile reed 19, and may then adjust the setting means until the amplitude of vibration of the reed 19 is a maximum. The reed 19 only vibrates with appreciable amplitude when excited at its natural frequency or any subharmonic of its natural frequency. By adjustment in manufacture of the reed 19, it may be caused to have a natural frequency that is harmonically related to the one or more flash-frequencies within the range that may be achieved by means of the adjustable resistance 11. In this way a number of calibration points may be secured within that range. Adjustment of calibration of the stroboscope may be effected in the usual manner, either by means of a padding condenser connected in parallel with the condenser 10 or by a separate padding resistance in series with the resistance 11, or by relative movement of the indicating means and setting means.

In order to improve the accuracy of calibration, however, the vibratile reed 19 is preferably so arranged as to be illuminated only by light from the lamp 1. In this case the reed 19 is preferably mounted in a mask upon which its normal or undeflected position is indicated by a reference mark. Referring to Fig. 2 diagram $a$ shows the appearance of the end of the reed 19, surrounded by a mask 20 provided with reference marks 21, when the reed is unexcited. Diagram $b$ illustrates the appearance of the end of the reed, when viewed by steady light and excited to vibration by a flash-frequency to which the natural frequency of the reed is harmonically related. Diagram $c$ illustrates the appearance of the end of the reed 19 when illuminated at the flash-frequency by light from the lamp 1, the flash-frequency being either very slightly above or very slightly below, say below, the natural frequency of the reed or a subharmonic of it. If the flash-frequency of the stroboscope had been very slightly above the natural frequency of the reed or a subharmonic of it, the latter would appear stationary but above the reference mark 21, instead of below it as in diagram $c$. If, however, the flash-frequency is precisely equal to the natural frequency of the reed or to a subharmonic of it, the reed 19 appears stationary and in line with the reference marks 21 as shown in diagram $d$ of Fig. 2.

It will be appreciated, that instead of the single adjustable resistance 11, and two condensers 10 and 12, a single condenser might be employed in combination with two equal ganged adjustable resistances, in place of the resistance 11, one of them being controlled by a manually operable switch such resistances might be in parallel with one another, in which case the switch would be arranged in series with one of them; or they might be in series, in which case the switch would be in parallel with one of them. Or, again, a single condenser that is adjustable continuously through a range of capacity valves might be under the control of the setting means, and two equal fixed resistors with an appropriately arranged manual switch might be employed. The required condition is that either one of the capacity or the resistance with time constant circuit should be adjustable through a range by the setting means, while the other of them may be doubled or halved by the manually operable switch.

Figure 4:
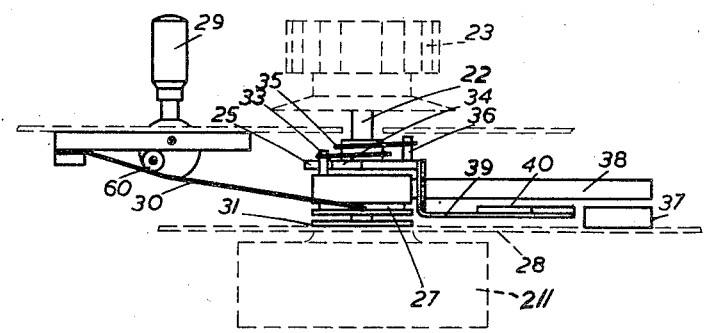
Fig. 4 is a side elevation of the control mechanism shown in Fig. 2.
Figure 3:
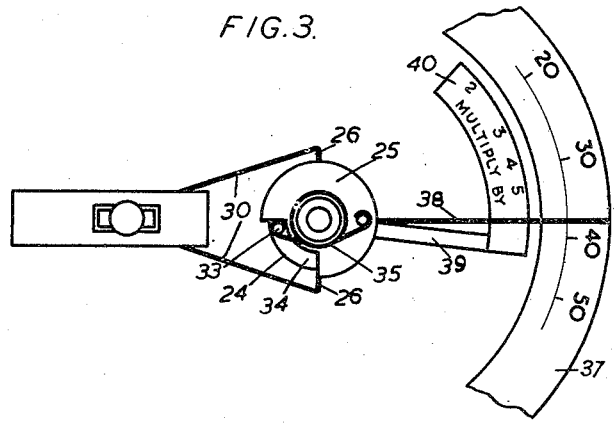
Fig. 3 is a diagrammatic front elevation of a preferred form of control mechanism for a stroboscope according to the invention that may be used in conjunction with a stroboscope having an electric circuit similar to that shown in Fig. 1.

In Figs. 3 and 4 is illustrated an embodiment of the invention that may be applied conveniently to any stroboscope that is provided with flash-frequency determining means operating logarithmically, that is such as to change the flash-frequency by equal factors for equal displacement. Referring to Figs. 3 and 4 flash-frequency determining means 211 of the nature and operating logarithmically as specified, is provided with a spindle 22 to which a manually operable knob 23 is fixed. Equal rotations of the knob 23 and spindle therefore change the flash-frequency by the same factor.

A clutch member 24 is rotatable and slidable on the spindle 22 between a friction disc 31 secured to the base or frame 28 of the instrument and a flanged collar 25 secured to the spindle 22. A resilient fork 30 has fingers 26 engaging a peripheral groove 27 in the clutch member 24. The fork 30 normally urges the clutch member 24 into frictional engagement with the flanged collar 25. An eccentric 60 journalled in a member that is fixed to the base or frame 28 of the instrument and manually operable by means of a lever 29 serves to flex the fork 30 so as to slide the clutch member 24 into frictional engagement with the friction disc 31 that is secured to the base or frame 28.

A lost motion connection is provided between the spindle 22 and the clutch member 24 by means of a pin 33 that engages a peripheral recess 34 in the flange of the flanged collar 25. Furthermore a resilient connection between the spindle 22 and the clutch member 24 is provided by a helical spring interconnecting the pin 33 with a pin 35 fixed to the flanged collar 25. The spring is arranged to bias clutch member 24 with respect to the flanged collar 25 and spindle 22 to an extreme position in which the pin 33 abuts against one end of the peripheral recess 34. The peripheral extent of the recess 34 is such that, having regard to the properties of the flash-frequency determining means 211 of the stroboscope, when the clutch member 24 is locked against the friction disc 31 by actuation of the eccentric 26, the spindle 22 and flanged collar 25 may be rotated just sufficiently to enable the flash-frequency to be doubled before the pin 33 abuts against the other end of the recess.

A scale 37 calibrated in terms of flash-frequencies is fixed to the base 28 of the instrument. A cooperating pointer 38 forming with the scale 37 a scale and index combination, is secured to the clutch member 24. Preferably also an auxiliary scale 40 is carried by an arm 39 fixed to the flanged collar 25, and serves to cooperate with the pointer 38.

In the use of the device illustrated in Figs. 3 and 4, the operator, with the handle 29 in the position shown, in which the clutch member 24 is engaged with the flanged collar 25, adjusts the knob 23 until the object under observation appears stationary. He then actuates the handle 29 to move the clutch member 24 into engagement with the friction disc 31 that is secured to the base or frame 28 of the instrument, thus locking the pointer 38 relative to the scale 37. He then actuates the knob 23 against the resilient constraint of the spring 35 as far as he may, that is until the pin 33 abuts against the other end of the peripheral recess 34, thus doubling the flash-frequency. If the object now appears to be stationary in two positions, the frequency indicated by the pointer on the scale is the correct frequency of the cyclical movement of the object or an odd submultiple. If the auxiliary scale 40 is provided, the operator, after actuating the handle 29, may rotate the knob 23 slowly against the bias of the spring 35 until he reaches a position at which the object appears stationary in one or two positions. If, in carrying out this sweep of frequency, one or more settings of the knob 23 and auxiliary scale 40 can be found at which the object appears stationary in one position, the amount by which the knob 23 and scale 40 are turned to encounter the first of these single apparent positions of the object depends solely upon what submultiple the initial frequency indicated by the pointer 38 of the scale 37 is of the prior frequency of the cyclical motion of the object.

On release of the handle 29, the pointer 38 is restored to alignment with the spindle 22, knob 23 and auxiliary scale 40 by the spring 35.

Figs. 5 and 6 illustrate another form of the invention. As illustrated this form is of the class just mentioned, but it is easily adaptable to the second mentioned class of stroboscope, as will be made clear.

The stroboscope shown in Figs. 5 and 6 comprises a rotary occulting shutter adapted alternatively to transmit and to occult light from an electric lamp 41 that is continuously energized from a source of electrical energy not shown. The shutter is operatively connected to an electric motor 42 that serves to rotate it. The speed of the electric motor, that is energized from a source of supply not shown, is manually controllable continuously through a range of speeds by means of a rheostat 43, so that the frequency of transmission and occulation, that is the flash-frequency, may be varied over a range of frequencies.

The shutter itself comprises an opaque member in the form of a circular disc 44 coaxially secured to a hub 45 provided upon the shaft 46 of the motor 42. The disc 44 has an even number of apertures 47 evenly spaced near its periphery and remote from the axis of rotation. A second member in the form of a circular disc 48 is mounted coaxially upon the hub 45 by means of a sleeve 49. This second member 48 has a series of apertures 50 separated by equally spaced opaque portions in number equal to one half the number of the apertures 47.

The sleeve 49 has a screw-and-nut engagement with the hub 45, that is provided by a spiral land 51 on the hub 45 engaging a corresponding spiral spline in the sleeve 49. A bell crank lever 53, having a handle 51, and equipped with a fork 54 with trunnion 55 engaging a circumferential slot 56 formed in the sleeve 49, serves as a manually operable means whereby the sleeve 49 and disc 48 may be moved axially relative to the hub 45 and disc 44, so that relative angular displacement between the discs 44 and 48 is produced owing to the screw-and-nut connection between the hub 45 and sleeve 49. Pins 54 fixed to the disc 44 cooperate with arcuate slots in the disc 48 to limit this relative angular displacement, and are so disposed that in one extreme relative position the opaque portions of the disc 48 overlie and obstruct alternate apertures 47 of the disc 44, and in the other extreme position the apertures 50 of the disc 48 are aligned with alternate apertures 47. Thus the number of transmissions and occultations of the light from the lamp 41 that occur in one revolution of the shaft 46 of the motor 42 is doubled when the handle 52 is so operated as to change the relative position of the discs 44 and 48 from the first mentioned to the second mentioned extreme.

The parts described may be enclosed within a light-tight casing 55 having an aperture 56 through which the stroboscope light flashes are collimated by a lens 57.

In the operation of the stroboscope shown in Figs. 5 and 6, the operator, after setting the handle 52 in such a position that one half of the apertures 47 are obstructed by the opaque portions of the disc 48, adjusts the rheostat 43 until the object under examination appears stationary in a single position. He then moves the handle 52 to its other extreme position, thus doubling the flash-frequency, and observes whether or not the object then appears stationary in two positions.

An index and scale combination, calibrated in flash-frequency is operatively connected with the rheostat 43 and by its aid the frequency of the cyclical motion of the object may be read.

If a stroboscope of the second mentioned class be needed, it is only necessary to substitute the lamp 41, and perhaps, the lens 57 by a telescope or even a simple observation aperture or eyehole in the wall of the casing 55.

For the purpose of calibration, a vibratile resonant reed may be mounted upon the casing 55 and may be excited by any inherent unbalance, which may, if necessary, be artificially increased, of the rotary structure. This reed may moreover be so mounted that it is mainly illuminated by the stroboscope light flashes issuing through the apertures of the disc 44. Alternatively an electromagnetically excited reed, as described with reference to Fig. 1, may be employed by connecting its electromagnet in series with contacts operated by a cam that rotates with the motor shaft 46 and with a source of electrical supply.

It will be appreciated that, while certain specific embodiments of the invention have been described with reference to and shown in the accompanying drawings, many modifications may be made without departing from the scope of the invention.

What I claim is:

1. In a stroboscopic, variable frequency reference device, a flash lamp of the gas discharge type comprising a translucent sealed envelope having spaced apart electrodes and an ionizable gas therewithin, and an oscillator circuit for flashing said lamp, said oscillator circuit comprising a space-discharge oscillator tube having a cathode and anode and a grid, a power supply connected between the cathode and anode of said oscillator tube, a transformer having inductively coupled primary and secondary windings, the primary winding being connected between the anode of said tube and said power supply and having at least a part thereof connected across the electrodes of said lamp, a resonant circuit connected in the grid-cathode circuit of said oscillator tube and including the secondary winding of said transformer, a manually variable resistor for controlling a first resonant frequency of said oscillator circuit, a pair of condensers having values such that the value of one is a predetermined multiple of the value of the other, and manually operable switch means alternatively providing one or both of said condensers in said resonant circuit, whereby said switch means may be operated to change the resonant frequeny of said oscillator circuit from said first frequency to a second frequency that is a predetermined multiple of said first frequency, said condensers being connected in series with said resistor and between one end of said transformer secondary winding and the cathode of said oscillator tube, the other end of said transformer secondary being connected with said cathode, and the grid of said tube being connected to the junction of said resistor and condensers.

2. A stroboscopic device of the character recited in claim 1 in which the pair of condensers and manually operable switch means are connected together so that alternatively one condenser or both condensers in parallel are connected in series with the resistor in the resonant circuit.

ERIC LLOYD THOMAS.

REFERENCES CITED

The following references are of record in the file of this patent:

UNITED STATES PATENTS

| Number | Name | Date |
|---|---|---|
| 1,934,519 | Anderson | Nov. 7, 1933 |
| 2,073,247 | Miller | Mar. 9, 1937 |
| 2,111,153 | Nichols | Mar. 15, 1938 |
| 2,133,138 | Hamacher | Oct. 11, 1938 |
| 2,139,057 | Brockstedt | Dec. 6, 1938 |
| 2,331,317 | Germeshausen | Oct. 12, 1943 |
| 2,491,342 | Townshend | Dec. 13, 1949 |